United States Patent [19]

Abthoff et al.

[11] 4,377,135
[45] Mar. 22, 1983

[54] ADDITIVE MEANS FOR AN AIR COMPRESSING INTERNAL COMBUSTION ENGINE

[75] Inventors: Jörg Abthoff, Plüderhausen; Hans-Dieter Schuster, Schorndorf; Hans-Joachim Langer, Remseck; Marijan Laszlo, Stuttgart, all of Fed. Rep. of Germany

[73] Assignee: Daimler-Benz Aktiengesellschaft, Stuttgart, Fed. Rep. of Germany

[21] Appl. No.: 203,545

[22] Filed: Nov. 3, 1980

[30] Foreign Application Priority Data

Nov. 2, 1979 [DE] Fed. Rep. of Germany ....... 2944318

[51] Int. Cl.³ .............................................. F02D 19/00
[52] U.S. Cl. .................................. 123/25 J; 123/198 A; 123/25 R; 123/25 M; 123/25 N
[58] Field of Search .............. 123/25 L, 25 M, 25 N, 123/25 R, 25 A, 25 J, 1 A, 198 A, 439

[56] References Cited

U.S. PATENT DOCUMENTS

| | | | |
|---|---|---|---|
| 3,631,843 | 1/1972 | Yeiser | 123/25 M |
| 3,857,543 | 12/1974 | McKeen | 123/25 M |
| 3,911,871 | 10/1975 | Williams et al. | 123/25 M |
| 4,096,829 | 6/1978 | Spears | 123/25 L |
| 4,122,803 | 10/1978 | Miller | 123/25 M |
| 4,240,380 | 12/1980 | Slagle | 123/25 L |

Primary Examiner—Ira S. Lazarus
Attorney, Agent, or Firm—Craig & Burns

[57] ABSTRACT

An arrangement for supplying an additive to a fuel-injected air compressing internal combustion engine. The arrangement includes a feeding device arranged at an inlet or intake of the internal combustion engine and a load and/or speed dependent metering device is provided which controls the supply of the additive to the feeding device.

10 Claims, 3 Drawing Figures

ADDITIVE MEANS FOR AN AIR COMPRESSING INTERNAL COMBUSTION ENGINE

The present invention relates to a feed arrangement and, more particularly, to a feed means for an additive, in particular, water, for an air compressing fuel-injected internal combustion engine.

With high speed engines of the aforementioned type, it has been proposed to affect combustion in such a manner that excessive peak temperatures or peak pressures are avoided. Consequently, it has been suggested to inject water directly into the combustion chamber by means of a feeding device in order to provide for a local cooling of the content of the cylinder of the engine.

The aim underlying the present invention essentially resides in providing measures whereby an air compressing fuel-injected internal combustion engine has an improved characteristic over the prior constructions while effecting a considerable reduction of nitrogen oxides in the exhaust of the engine and simultaneously suppressing the formation of carbon black.

In accordance with advantageous features of the present invention, a feed means is arranged at an inlet of the air compressing fuel-injected internal combustion engine with a metering device being provided for controlling a supply of the additive to the feed means in dependence upon the load and/or speed of the engine.

By virtue of the fact that the additive, for example, water, is added prior to an entrance into the combustion chamber, the additive may be thoroughly intermixed with the drawn-in air and may enter the combustion chamber as a prepared air-additive mixture, whereby the combustion initiated after injection of the fuel is favorably affected with regard to a reduction of an emission of nitrogen oxides. The decrease in nitrogen oxide is further enhanced by the fact that, for each operating point in the engine characteristic area, an optimum quantity of additive is admixed in finely-atomized form to the intake air.

Advantageously, in accordance with the present invention, an electromagnetic valve may be associated with the feed means in order to control a supply of the additive. Preferably, an electronic control device is connected upstream of the solenoid valve, with the control device being adapted to convert a signal picking up the load and/or speed into a timing ratio, that is, an open and closed ratio of the solenoid valve per unit of time, so as to control the condition of the solenoid valve.

In accordance with further features of the present invention, a variable resistor may be provided and utilized as the load pickup with the resistor responding to, for example, respective positions of a gas pedal or accelerator.

In accordance with further advantageous features of the present invention, the feed means may be constructed along the line of a carburetor and may be provided with a control piston which includes a nozzle needle for controlling a through-flow of the additive. The control piston regulates the feeding quantity of the additive in dependence upon the air velocity.

It is also possible in accordance with the present invention to construct the feed means so as to take the form of an injection nozzle. The solenoid valve may be associated with the nozzle, with the solenoid valve being acted upon by the control device, which control device processes signals representing the load as well as the speed of the internal combustion engine.

With the feed means constructed or operating in the manner of a carburetor, such feed means supplies the amount of additive in dependence upon a vacuum ambient upstream of an inlet of the internal combustion engine. The electrical control device interposed in the metering device thus requires as an input merely a load signal. Consequently, with such an arrangement, only the electric resistor, functioning as a load pickup, transmits a signal to the control device. With the feed means constructed as an injection or atomizer nozzle for supplying the additive, two input variables are required, namely, the load signal and a signal covering the speed of the engine.

Accordingly, it is an object of the present invention to provide an additive feed means for an air compressing fuel-injected internal combustion engine which avoids, by simple means, shortcomings and disadvantages encountered in the prior art.

Another object of the present invention resides in providing an additive feed means for an air compressing fuel-injected internal combustion engine which improves the combustion characteristic of the engine.

Yet another object of the present invention resides in providing an additive feed means for an air compressing fuel-injected internal combustion engine which considerably reduces the emission of nitrogen oxides.

A further object of the present invention resides in providing an additive feed means for an air compressing fuel-injected internal combustion engine which ensures a thorough intermixing of the additive with the combustion air prior to entrance of the same into a combustion chamber of the engine.

A still further object of the present invention resides in providing an additive feed means for an air compressing fuel-injected internal combustion engine which controls the feeding of the additive in response to at least one of the load or speed of the internal combustion engine.

Another object of the present invention resides in providing an additive feed means for an air compressing fuel-injected internal combustion engine which is simple in construction and therefore relatively inexpensive to manufacture.

Yet another object of the present invention resides in providing an additive feed means for an air compressing fuel-injected internal combustion engine which functions reliably under all operating conditions.

These and other objects, features and advantages of the present invention will become more apparent from the following description taken in connection with the accompanying drawings which show, for the purposes of illustration only, two embodiments in accordance with the present invention, and wherein.

Figure 1:
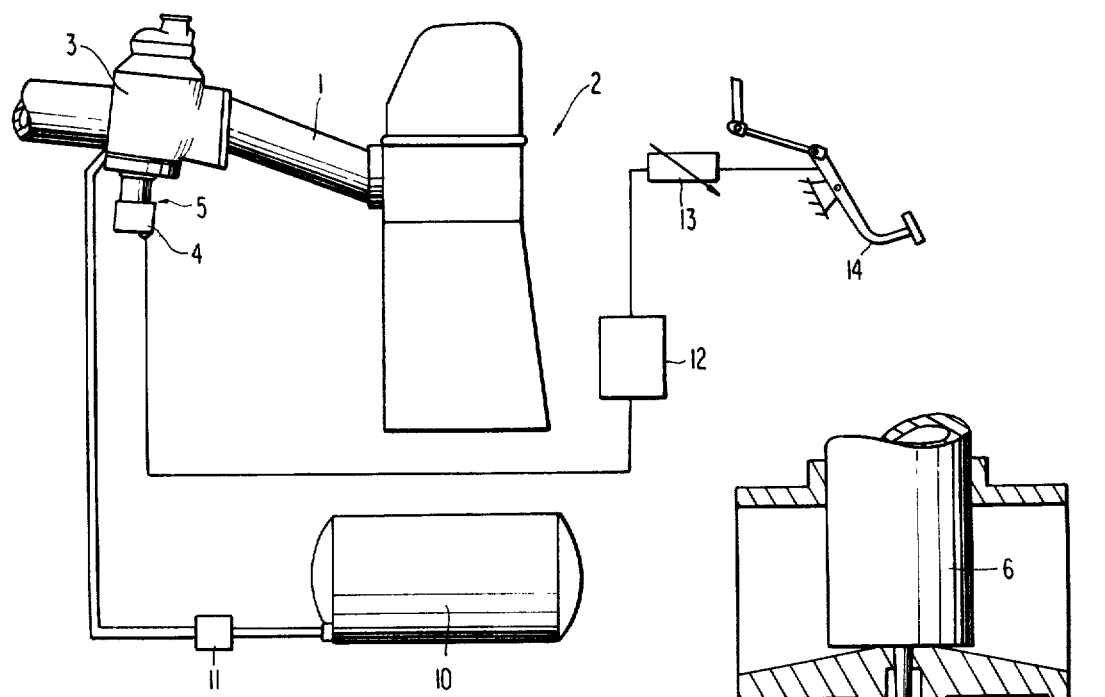
FIG. 1 is a schematic view of a first embodiment of a feed unit for supplying an additive to an air compressing fuel-injected internal combustion engine in accordance with the present invention.

Referring now to the drawings, wherein like reference numerals are used throughout the various views to designate like parts, and, more particularly, to FIG. 1, according to this figure, a feed means 3, constructed along the lines of a carburetor, is arranged in an intake manifold 1 of an air compressing fuel-injected internal combustion engine generally designated by the reference numeral 2. A metering device generally designated by the reference numeral 5 is provided with the feed means 3 and electromagnetic valve 4 being combined into a single structural unit or module.

Figure 2:
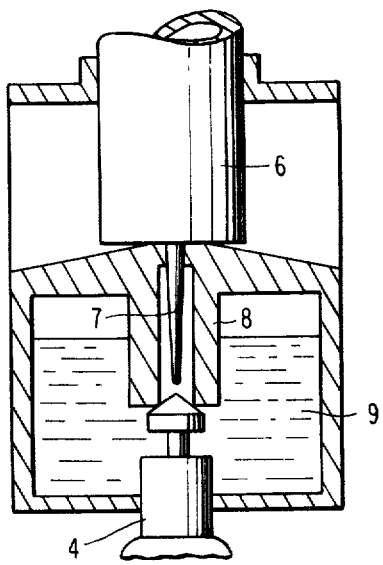
FIG. 2 is a cross-sectional view, on an enlarged scale, of a feed unit in accordance with the present invention constructed as a carburetor with a solenoid valve.

As shown in FIG. 2, the feed means 3 include the individual parts usual for a carburetor such as a venturi tube, a longitudinally-displaceable control piston 6 wih a nozzle needle 7 in a nozzle base 8 and a float chamber 9. An additive such as, for example, water, is fed to the float chamber by means of a conveying pump 11 from a tank or reservoir 10 which, in the illustrated embodiment, is a water tank. The position of the nozzle needle 7 in the nozzle base or stem 8 controls the flow of water. Additionally, the flow of water is determined by the positioning of the electromagnetic valve 4 which is arranged at the lower end of the nozzle base or stem 8.

In addition to the electromagnetic valve 5, the metering device 4 also includes an electronic control device 12, of conventional construction, which is adapted to process merely load signals into a timing ratio, and a variable resistor 13 which is constructed as a load pickup device. The variable resistor 13 is associated with a gas pedal or accelerator 14, a rod section (not shown) in the gas linkage, or with a part of a regulator linkage of an injection pump (not shown). In the embodiment of FIGS. 1 and 2, water is added to the intake air in dependence upon the load and air flow rate in the following manner:

The variable resistor 13, under the effect of the respective position of the gas pedal or accelerator 14, transmits a load signal to the electronic control device 12. The electronic control device 12 with the aid of the load signal produces a timing ratio corresponding to an open and closed ratio of the solenoid valve 4 per unit time proportional to a traversed distance of the gas pedal 14. The control device 12 provides an output or control signal which acts upon the solenoid valve 4. The solenoid valve 4, in response to the control signal from the control device 12, releases a load-dependent quantity of water. An addition of water to the intake air required for the respective operating conditions of the engine is attained by the fact that, in the final analysis, the amount of water drawn from the carburetor forming the feed means 3 is additionally dependent upon the air velocity at the needle nozzle 7.

By taking into account both parameters, namely, the speed or air velocity the load, an optimum amount of water is set for each operating point in the characteristic or operating area of the engine. Furthermore, by introducing the water into the intake manifold 1 up to or prior to an entrance of the combustion air into the combustion chamber of the engine 2, a satisfactory distribution and intermixing of the water with the intake air is attained.

Figure 3:
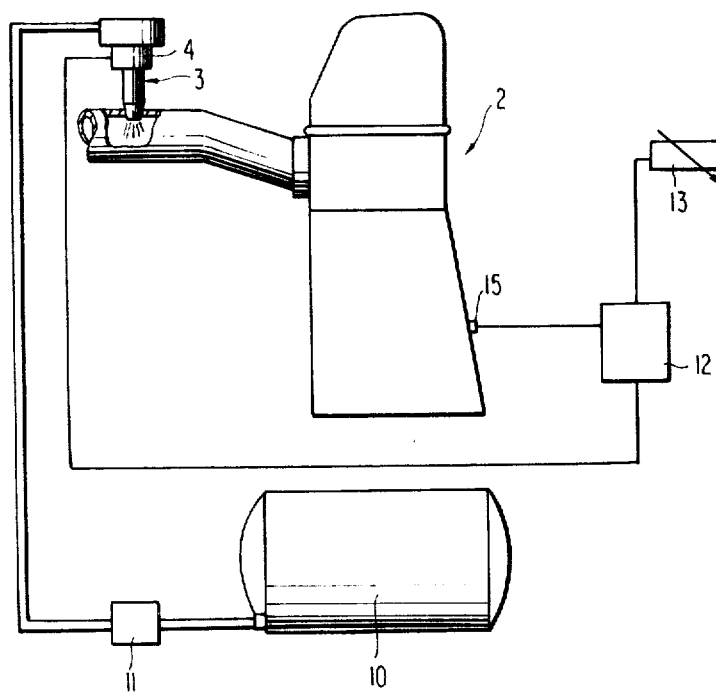
FIG. 3 is a schematic view of a second embodiment of a feed unit for supplying an additive to an air compressing fuel-injected internal combustion engine in accordance with the present invention.

As shown in FIG. 3, a feed means generally designated by the reference numeral 3' is constructed as an injection or atomizer nozzle disposed in the intake manifold 1 of the air compressing fuel-injected internal combustion engine 2. The feed means 3' cooperates with the solenoid valve 4 which is acted upon by the electronic control device 12 supplying signals corresponding to a variable open-closed timing ratio. The load signal is detected by the variable resistor 13 which is responsive to a position of the gas pedal or accelerator 14 and a speed signal may be picked up by, for example, a contacting means or sensor provided at the crankshaft 15. The load signal provided by the variable resistor 13 and the speed signal provided by the sensor means at the crankshaft 15 are transmitted to the electronic control device 12. The electronic control device 12 processes the load and speed signals and provides an appropriate output control signal. The output control signal is a result of a variable ratio of the opening and closing time of the electromagnetic valve 4 per unit time and thus a quantity of water is the result which likewise corresponds to the operating point in the characteristic of the engine 2 and which is injected into the intake manifold 1 through the injection or atomizer nozzle forming the feed means 3' so as to enable the additive to be thoroughly mixed at that location with the intake air.

While we have shown and described only two embodiments in accordance with the present invention, it is understood that the same is not limited thereto but is susceptible of numerous changes and modifications as known to one having ordinary skill in the art, and we therefore do not wish to be limited to the details shown and described herein but intend to cover all such changes and modifications obvious to those skilled in the art.

What is claimed is:

1. An arrangement for supplying an additive to a fuel-injected air compressing internal combustion engine, characterized in that means are arranged at an intake means of the internal combustion engine for feeding the additive into the intake means, and in that means are provided for metering a supply of the additive to the feeding means in response to at least one of a load or rotational speed of the engine, the metering means includes an electrical magnetic valve means operatively connected with the feeding means, the feeding means includes a nozzle needle means for controlling a flow of the additive through the feeding means, means are provided for controlling an opening and closing timing ratio of the electromagnetic valve means in response to signals representing the load of the engine, and in that said electromagnetic valve means is adapted to initially release a volume of the additive as a function of the load of the engine, with an actual volume of the additive being governed as a function of an air velocity at the nozzle needle means of the feeding means.

2. An arrangement according to claim 1, characterized in that the controlling means includes an electronic control means connected upstream of the electromagnetic valve for converting the signals into the timing ratio for the electromagnetic valve.

3. An arrangement according to claim 2, characterized in that a variable resistor means is operatively connected with a control member of the engine for providing an output signal representing a load on the engine to the electronic control means.

4. An arrangement according to claim 3, characterized in that the control member is an accelerator pedal.

5. An arrangement according to claim 3, characterized in that only the resistor means transmits a signal to the electronic control means.

6. An arrangement according to one of claims 2 or 3, characterized in that the feeding means is constructed as an injection nozzle means for injecting the additive into the intake means of the engine.

7. An arrangement for supplying an additive to a fuel-injected air compressing internal combustion engine, characterized in that means are arranged at an intake means of the internal combustion engine for feeding the additive into the intake means, means are provided for metering a supply of the additive to the feeding means, the metering means includes an electromagnetic valve means operatively connected with the feeding means, the feeding means is constructed as an injection nozzle means for injecting the additive into the intake means of the engine, means are provided for controlling an opening and closing timing ratio of the electromagnetic valve means in response to signals representing a load and speed of the engine, means are provided for sensing a rotational speed of the engine and for providing an output signal of the sensed speed to the electronic control means, so that the electromagnetic valve means is controlled in response to both the load and rotational speed of the internal combustion engine, said electronic control means being adapted to provide an output control signal whereby a variable ratio of the opening and closing times of the electromagnetic valve means is produced so that a volume of additive is released which is then injected through the injection nozzle means into the intake manifold means.

8. An arrangement for supplying an additive to a fuel-injected air compressing internal combustion engine, characterized in that means are arranged at an intake means of the internal combustion engine for feeding the additive into the intake means, means are provided for metering a supply of the additive to the feeding means in response to at least one of a load or rotational speed of the engine, and in that the feed means in constructed as a carburetor and includes a control piston for regulating a feeding quantity of the additive in dependence upon a velocity of intake air to the intake means of the engine, the control piston means includes a nozzle needle for controlling a flow of the additive through the feeding means.

9. An arrangement according to one of claims 1, 7 or 8, characterized in that the metering means and feeding means are combined into a single structural module arranged at the intake means of the internal combustion engine.

10. An arrangement according to claim 9, characterized in that the feeding means further includes a pump means for conveying the additive to the metering means, and in that said pump means is adapted to operate independently of the rotational speed of the engine.

* * * * *